March 28, 1944. H. ZIEBOLZ 2,345,526
FLOW PROPORTIONING APPARATUS
Filed July 31, 1941
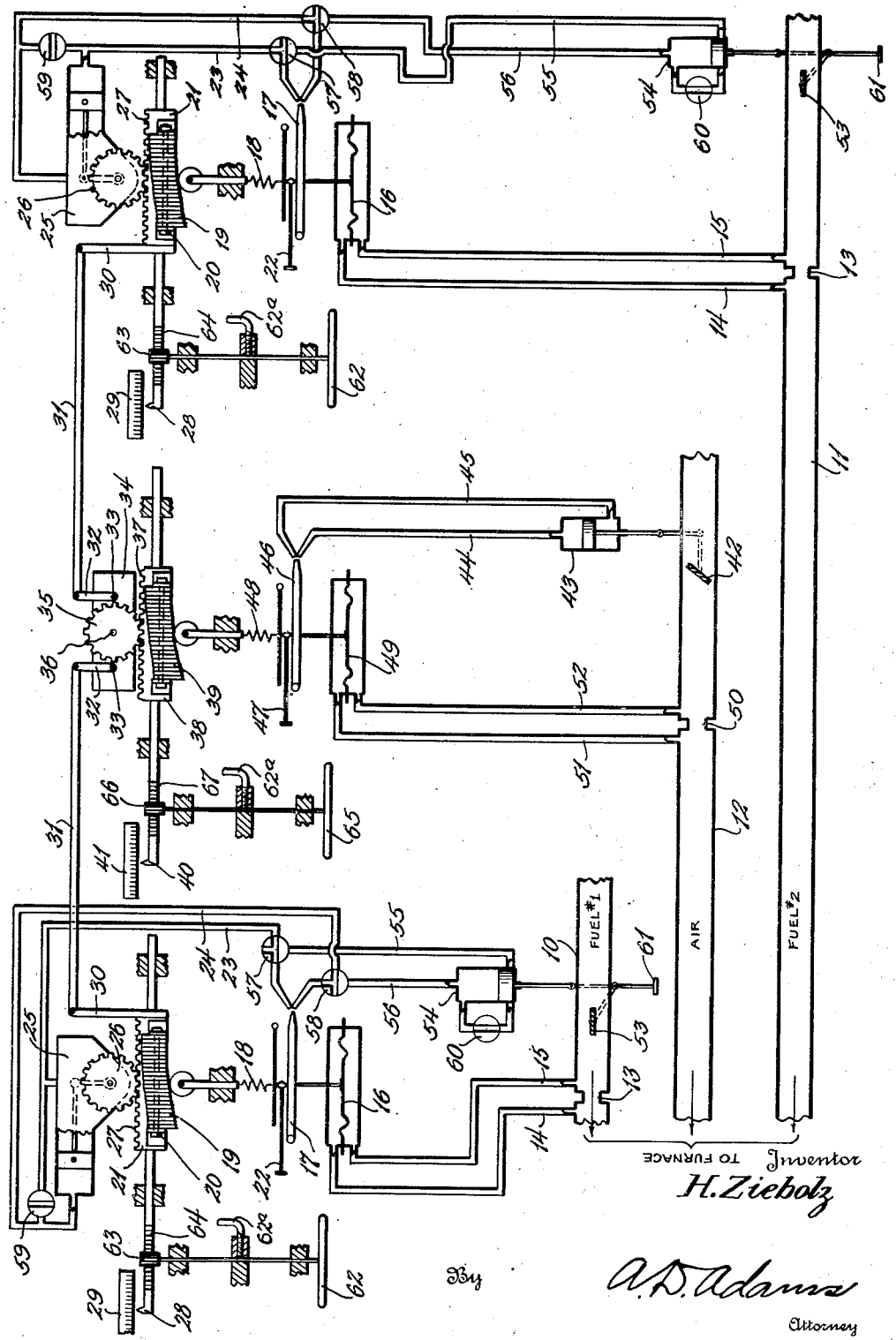
Inventor
H. Ziebolz
By
A. D. Adams
Attorney Patented Mar. 28, 1944

2,345,526

UNITED STATES PATENT OFFICE 2,345,526

FLOW PROPORTIONING APPARATUS

Herbert Ziebolz, Chicago, Ill., assignor to Askania Regulator Company, Chicago, Ill., a corporation of Illinois Application July 31, 1941, Serial No. 404,913

10 Claims. (Cl. 137—164)

This invention relates to improved apparatus for controlling and proportioning the supplies of separate fuels having different heating values and different theoretical air requirements to the controlled supply of combustion air. By "controlled supply" of air is meant the adjusted air admitted to a furnace or similar device independent of any air admitted along with the fuel for atomizing or conveying the fuel or admitted through uncontrolled leakage into such furnace. The main idea is to provide in a proportioning and control system for multiple fuels and air, improved regulating and control means having alternate or change-over controls whereby the supplies of the fuels may be controlled and/or proportioned in any one of a variety of ways to meet different requirements in furnace installations. For example, the invention contemplates a single control installation capable of manipulation whereby (1) the controlled air supply may be automatically proportioned to the uncontrolled supplies of the respective fuels; (2) the flow of one fuel may be varied and automatically controlled to maintain a constant supply and the controlled air supply is varied in response to changes in the flow of the other fuel which is uncontrolled; (3) the supplies of the separate fuels may be varied at will and automatically controlled to maintain their supplies constant and the controlled air supply may be automatically proportioned to the sum of the flows in response to changes which result from manual adjustments or settings of the fuel controls; (4) or the controlled supply of air may be manually controlled and automatically maintained constant to meet any desired heat demand or input in a furnace, while the flow of either fuel may be varied automatically in response to any changes in the flow of the other fuel which may be uncontrolled. A further aim is to provide control means of this character embodying a differential gear for proportioning or summarizing movements which are directly proportional to the controlled quantities of air necessary to support complete combustion of the separate fuels at their different rates of flow. The arrangement may include means whereby the controlled supply of air may be greater or less than the amount necessary to effect complete combustion of the individual fuels by a percentage which may be changed in accordance with changes in the characteristics of the separate fuels and to compensate for changes in density, temperature, etc.

This application involves important improvements over my copending applications Ser. No. 401,666, filed July 9, 1941, Ser. No. 401,667, filed July 9, 1941, Ser. No. 404,909, filed herewith and Ser. No. 404,910, also filed herewith.

Other aims and advantages of the invention will appear in the specification, when considered in connection with the accompanying drawing, wherein:

The figure is a diagrammatic illustration of one form of apparatus embodying the invention applied to the control of two fluid fuels and air.

Referring particularly to the drawing, the apparatus is illustrated as being applied to the control of two fluid fuels such as coke oven gas and blast furnace gas and combustion air in a steel furnace installation, for example, wherein the operating requirements often necessitate a variety of changes like those hereinbefore enumerated in the objects of the invention.

For the sake of simplicity and a clear understanding of the invention, the mechanism which is similar to that described in the aforesaid application Ser. No. 401,666, will first be described because all of the novel features are combined with it. As hereinbefore indicated, it will be assumed that the flows of the two fuels are uncontrolled and vary according to their available supplies; while the air flow is automatically controlled and proportioned to the flows of the fuels.

Herein, there are shown two fuel conduits 10 and 11 and a single air conduit 12 through which air is supplied for the combustion of both fuels. All of the conduits lead to an ordinary furnace (not shown).

The rates of flow of the separate fuels are determined by obtaining differential pressure flow impulses on opposite sides of restrictions in the fuel lines. These pressure differentials are transformed into movements which are directly proportional to the theoretical requirements of air necessary for the complete combustion of the respective fuels at their different rates of flow or to the "compensated air requirements" of the respective fuels at their different rates of flow. By "compensated requirements" is meant the theoretical requirement necessary for complete combustion modified by factors which depend on the amounts of air introduced along with the fuel to atomize it or to convey it to the burner. Such factors may be termed "burner factors." These movements are transmitted to the differential gear connected to control the flow of air. In actual practice, the apparatus is so adjusted that the movements take into account variable fuel factors, such as air admitted with the fuel so that they represent compensated air requirements for the respective fuels at their different rates of flow. Herein, each of the conduits 10 and 11 has a constriction 13, on the opposite sides of which, are connected pipes 14 and 15 leading to the opposite sides of a diaphragm 16 connected to act on one side of a pivoted jet pipe 17 of a differential pressure operated regulator of a well known type. The force exerted by the diaphragm acts in opposition to a spring 18, the compression of which is controlled by a cam 19 of adjustable contour. If the theoretical amount of air necessary for complete combustion of the individual fuels is not to be modified to take into account "burner factors" the cams will be of square root shape. However, if burner factors are to be taken into account, the cams will be shaped to depart from square root cams. Herein, the cam is shown as being composed of a multiplicity of relatively adjustable, slotted pieces clamped together by a bolt 20 and secured to a carriage 21 which is slidably mounted in fixed bearings. The jet pipe regulator has an ordinary ratio slider 22 which may be employed to multiply the theoretical quantity of air necessary for complete combustion of the individual fuels at the various rates of flow or of the "compensated air requirements" of the individual fuels by any desired factor. The jet pipe is shown as delivering fluid to one or the other of two conduits 23 and 24 connected to operate a servo-motor 25 of the piston type which, in turn, operates a gear 26 meshing with a rack 27 on the carriage 21. The carriage is shown as carrying a pointer 28 cooperating with an indicating scale 29 which indicates the proportioned quantities of air corresponding with the flow of the fuel.

It will be seen that a force exerted by the diaphragm 16 on the jet pipe relay will move the jet pipe until the servo-motor operates the cam 19 and compresses spring 18 sufficiently to counterbalance the action of the diaphragm force and returns the jet pipe to its neutral position. Thus, a definite relation between the flow impulses and the movement of the cam, indicated by pointer 28, is established. Regardless of the characteristic of a flow impulse which, in this case, is a second power function, it is always possible to produce a corresponding movement of the cam 19 which is directly proportional to the theoretical or the compensated air requirements for the individual fuels for a given rate of flow.

The ratio sliders 22 permit the introduction of correction factors which take into account variations in the chemical analysis of the fuels, viscosity changes, in the case of liquid fuels, density changes, etc. Any change in the position of the ratio sliders 20 increases or decreases the stroke of the cams directly proportional to the impulses throughout the flow ranges.

The movements of the cams are transmitted through the differential gear to an air regulator. Herein, each rack is shown as carrying a fixed arm 30 to which is pivotally connected an operating link 31. The operating links are connected in turn, to cranks 32 which actuate fuel shafts 33 of a differential gear 34 having a spur gear 35 on a main shaft 36. Such a differential gear is shown in detail in the aforesaid application Ser. No. 401,666. It summarizes the movements of the two fuel cams 19 and imparts the sum of these movements through the gear 35 which operates a rack 37 on a carriage 38 similar to the carriages 21. The carriage has an adjustable cam 39 similar to cams 19. This cam may be a square root cam or shaped to take into account total air infiltration in the furnace and to vary the supply of air so that its movements represent the adjusted total air flow corresponding to the rates of flow of the two fuels. By "adjusted total air" is meant the amount of air indicated as required by the summarizer modified by a factor which takes into account air infiltration into the furnace at various rates of flow of the two fuels. It is mounted similarly to the carriages 21 and is also shown as carrying a pointer 40 cooperating with a scale 41, to indicate the adjusted total air requirements for both fuels because the movement imparted to the gear 35 and, through it, to the cam 39, is the sum of the movements imparted by the separate cams through the differential gear.

Now, the flow of the air in conduit 12 is shown as being controlled by a butterfly valve 42 which is actuated by a piston type servo-motor 43. The servo-motor is connected by pipes 44 and 45 to be operated by a jet pipe regulator 46, also having a ratio slider 47, whereby the air ratio may be changed at will. The cam 39 acts on one side of the jet pipe through a spring 48 and changes the setting of the regulator to control the air flow through conduit 12. The spring acts on the jet pipe in opposition to a diaphragm 49 on the opposite side of the jet pipe, and the position of the diaphragm is controlled by the pressure differential across a constriction 50 in the air conduit acting through pipes 51 and 52 on opposite sides of the diaphragm. As the spring is compressed by the movement of the cam to the right, the jet pipe turns clockwise and thereby causes the servo-motor to open the valve 42 until the increase in air flow creates a differential pressure across the constriction 50 which is sufficient to counterbalance the spring tension. Thus, the total air flow in conduit 20 is so controlled that it is directly proportional to the sum of the air called for by the individual fuels. The adjustments of the ratio slider 47 permit the amount of air called for by movements of cam 39 to be multiplied by a given factor, thus controlling the percentage of excess or deficiency necessary for complete combustion in the furnace.

As the flow of fuel 1 increases, for example, it will be understood that the regulator and the mechanism will impart movement to the lefthand link 31 and crank 32 to the right, and as the flow of fuel 2 increases, the right hand link and crank will likewise be moved to the right, thus transmitting counterclockwise movement to the gear 35 through the differential gear shaft 36. This moves the cam 39 to the right. The cam, in turn, moves the jet pipe 46 clockwise to operate the piston of the servo-motor 43 in a direction to open the valve 42 and thereby increase the flow of air. Then, the resistance to movement of the jet pipe is increased by an increased differential pressure acting on the diaphragm 49. When the differential pressure counterbalances the spring pressure, the jet pipe automatically returns to its neutral position.

To enable the mechanism to control the flow of both fuels or either of them instead of deriving air control impulses from them, each fuel conduit has a butterfly valve 53 which may be operated manually and is also connected to be operated automatically by a servo-motor 54 of the piston type having its cylinder connected by branch pipes 55 and 56 to the pipes 23 and 24 respectively through manually operable three-way valves 57 and 58. The cylinders of both servo-motors 25 and 54 have by-passes controlled by cut off valves 59 and 60, respectively. When the by-pass valve of servo-motor 54 is opened, the butterfly valve is freed to be operated manually to enable it to be fully opened by a manipulating member 61. When the by-pass valve of servo-motor 25 is opened the carriage 21 is freed to be adjusted manually by a hand wheel 62 operating a pinion 63 meshing with a rack 64 on the carriage. Incidentally, the air cam carriage is adapted to be manually set or adjusted by a similar hand wheel 65 operating a pinion 66 meshing with a rack 67 on the carriage.

Referring to the mode of operating the mechanism to accomplish the different purposes hereinbefore explained, it will be seen that the valves 53, 57, 58, 59 and 60 are all shown as being adjusted to permit the system to provide for the uncontrolled flows of both fuels and to proportion the flow of air accordingly. Now, if it is desired to maintain constant the supply of one fuel, say, a primary fuel or the fuel #1, at any desired constant rate, while the other fuel or fuel #2 is uncontrolled and the air is automatically controlled accordingly, the three-way valves 57 and 58, associated with the lefthand regulator, are turned so that the jet pipe delivers fluid through pipes 55 and 56 to operate the servo-motor 54, the by-pass valve 60 of which is closed; while the by-pass valve 59 is opened to permit manual setting of the fuel cam 19 by the hand wheel 62. All of the valves associated with the other fuel regulator and the servo-motors, operated thereby, remain unchanged. The manual setting of the primary fuel regulator imparts control movements to the differential gear which are proportional to the amount of air called for by the primary fuel; while the flow of the other fuel imparts control movements to the differential gear which are proportional to the varying amounts of air called for by that fuel and the total air flow is varied accordingly by the controlled movements of the air cam. Incidentally, the adjusting hand wheel may be held immovable in its adjusted position by any suitable locking means, such as a set screw 62a; while the other hand wheels are free to be rotated by automatic movements of their respective carriages. The hand wheel 65 is also shown as having a locking set screw 65a.

If the supplies of both fuels are to be adjusted and maintained constant, all of the valves of both fuel regulators are turned as just described in connection with the primary fuel regulators, so that both fuel regulators operate the butterfly valves 53 and both hand wheels 62 may be turned and locked to set the regulators to supply any desired quantities of the respective fuels. The adjusting movements of the fuel cams impart movement to air cam 39 through the differential gear 34 and this movement is proportional to the total amount of air called for by the separate fuels.

When it is desired to maintain a definite heat input in a furnace using all available primary fuel, say fuel #1 and automatically controlling the flow of the other fuel, to make up the difference, the total air supply to meet the demand may be set and maintained constant by the air regulator. In that case, the hand wheel 65 is adjusted and locked. The valves of the lefthand or primary fuel regulator are adjusted, as shown in the drawing, so that flow impulses of that fuel operate the servo-motor 25 and the cam 19. The valves of the right hand or secondary fuel regulator are turned to disable the servo-motor 25 and to enable that regulator to operate the butterfly valve 53 in conduit 11. The movements imparted to the left hand cam 19 are transmitted through the differential gearing to the secondary fuel cam 19, so that the flow of secondary fuel is automatically varied in inverse proportion to variations in the flow of the primary fuel.

Obviously, it is possible to cut off the flow of either fuel and control the flow of the other when it is desirable to use a single fuel. Moreover, any number of fuels may be controlled by employing an additional differential gear for each additional fuel.

From the foregoing description, it will be seen that the apparatus is capable of a wide variety of controlling operations to meet different requirements. Further, the parts may be standardized and are interchangeable. They may be mounted on a single table and the cam carriages may be guided on a single track. The indicators may be of any well known type, either electrical or mechanical and remotely controlled.

Obviously, the present invention is not restricted to the particular embodiment thereof herein shown and described. Moreover, it is not indispensable that all the features of the invention be used conjointly, since they may be employed advantageously in various combinations and sub-combinations.

What is claimed is:

1. Apparatus for controlling and proportioning the supplies of at least two separate fuels relative to the controlled supply of combustion air comprising, in combination, conduits for the air and the fuels; automatic regulators connected to the respective fuel conduits constructed and arranged to control the fuel flows and each having a movable element connected to be displaced relative to a fixed point corresponding to zero fuel flow by amounts proportional to predetermined quantities of air necessary to support complete combustion of the respective fuels at their varying rates of flow; a regulator connected to the air conduit constructed and arranged to control the flow of air therethrough and also having a movable element adapted to be displaced relative to a fixed point by amounts proportional to total air flow through the conduit; summarizing means connected to be operated by the movable element of the air regulator; means also connecting the summarizing means to displace the movable elements of the fuel regulators in proportion to the displacement of the movable element of the air regulator and thereby proportion the total supply of the fuels in accordance with the total air supply; and means, including servo-motors and manually operable control valves associated with the respective fuel regulators constructed and arranged to convert said regulators into flow responsive means, said servo-motors being connected to operate said movable elements of said fuel regulators, whereby controlling movements may be imparted through said summarizing means to the movable element of said air regulator and the total supply of air may be proportioned to the supplies of both fuels.

2. Apparatus for controlling and proportioning the supplies of at least two separate fuels relative to the controlled supply of combustion air comprising, in combination, conduits for the air and the fuels; automatic regulators connected to the respective fuel conduits constructed and arranged to control the fuel flows and each having a movable element connected to be displaced relative to a fixed point corresponding to zero fuel flow by amounts proportional to predetermined quantities of air necessary to support complete combustion of the respective fuels at their varying rates of flow; a regulator connected to the air conduit constructed and arranged to control the flow of air therethrough and also having a movable element adapted to be displaced relative to a fixed point by amounts proportional to total air flow through the conduit; summarizing means connected to be operated by the movable element of the air regulator; means also connecting the summarizing means to displace the movable elements of the fuel regulators in proportion to the displacement of the movable element of the air regulator and thereby proportion the total supply of the fuels in accordance with the total air supply; manually operable setting means connected to the movable elements of the respective fuel regulators to impart setting movements therethrough to the summarizing means and, in turn, to the movable element of the air regulator, whereby the flow of either fuel may be regulated and maintained constant, while the flow of the other fuel varies; and means, including servo-motors and manually operable control valves associated with the respective fuel regulators constructed and arranged to convert said regulators into flow responsive means, said servo-motors being connected to operate said movable elements of said fuel regulators, whereby controlling movements may be imparted through said summarizing means to the movable element of said air regulator and the total supply of air may be proportioned to the supplies of both fuels.

3. Apparatus for controlling and proportioning the supplies of at least two separate fuels relative to the controlled supply of combustion air comprising, in combination, conduits for the air and the fuels; hydraulic flow responsive control regulators connected to the respective fuel conduits and each having a movable control element so constructed and arranged that their displacements relative to a fixed point corresponding to zero fuel flow are proportional to predetermined amounts of air necessary to support complete combustion of the respective fuels at their different rates of flow; a flow control regulator connected to the air conduit to control the supply of air and having a movable control element; a summarizer connected to the movable control elements of the fuel regulators and operatively connected to the movable control element of the air regulator, the construction and arrangement being such that the displacement of the air control element corresponds to the total displacements of the fuel regulator control elements and calls for a corresponding total supply of air for the two fuels; manually operable setting means connected to the air regulator control element to adjust the air flow according to the heat demand; means, including a servo-motor, connected to the control element of each fuel regulator to create and transmit control movements to the summarizer in response to variations in the fuel flows; and change-over control valves associated with the respective fuel regulators constructed and arranged to disconnect selected ones of them from the fuel valves and simultaneously connect them to operate the servo-motors, so that the servo-motors will actuate the fuel regulator control elements.

4. Apparatus, as set forth in claim 1, wherein the fuel regulators are of the hydraulic type connected to operate control valves in the fuel conduits.

5. Apparatus, as set forth in claim 3, wherein manually operable setting means are connected to the control elements of the fuel regulators and are adapted to set the regulators so that they call for predetermined, constant fuel flows, the arrangement being such that the setting movements are imparted through the summarizer to the control element of the air regulator.

6. Apparatus, as set forth in claim 3, wherein the control elements for the fuel regulators comprise spring loading cams connected to the servo-motors, the whole arrangement being such that any or all of the fuels may be either controlled or uncontrolled and total controlled air flow proportioned accordingly.

7. Apparatus, according to claim 3, wherein the fuel regulators have ratio varying means.

8. Apparatus, as set forth in claim 3, wherein the air regulator has ratio varying means.

9. Apparatus, according to claim 3, wherein the fuel regulators and their associated mechanism are all alike and are interchangeable.

10. Apparatus, according to claim 3, wherein the fuel regulators are of the fluid jet pipe type and the changeover means comprises conduits and manually operated valves to disconnect the regulators from their servo-motors and connect them to the fuel control valves.

HERBERT ZIEBOLZ.